United States Patent
Simms et al.

(10) Patent No.: US 9,526,072 B1
(45) Date of Patent: Dec. 20, 2016

(54) METHOD, DEVICE, AND SYSTEM FOR OPERATING A MULTI-FUNCTION VOICE-COLLABORATION DEVICE TO MANAGE BATTERY LIFE

(71) Applicant: MOTOROLA SOLUTIONS, INC, Schaumburg, IL (US)

(72) Inventors: Matthew E. Simms, Davie, FL (US); Darrell J. Stogner, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/877,293

(22) Filed: Oct. 7, 2015

(51) Int. Cl.
*H04W 52/02* (2009.01)

(52) U.S. Cl.
CPC ................. *H04W 52/0251* (2013.01)

(58) Field of Classification Search
CPC ................ H04W 52/0251; H04W 52/0261; H04W 76/046; H04W 52/027; H02J 7/0021; H02J 7/007; H01M 4/366; H01M 4/64; G09G 5/00; G09G 2330/021; H04M 1/6083; G06F 3/041; G06F 3/0205; H04N 1/00899; B41J 29/13
USPC ...... 455/574, 187.1; 429/211, 224; 713/320; 345/160; 362/184, 231; 705/2
See application file for complete search history.

(56) References Cited

U.S. PATENT DOCUMENTS

| | | | |
|---|---|---|---|
| 2004/0121819 A1* | 6/2004 | Vogel | H04M 1/6091 455/569.2 |
| 2009/0011801 A1 | 1/2009 | Van Der Schaar et al. | |
| 2013/0176714 A1* | 7/2013 | Leegate | F21V 23/0414 362/184 |

OTHER PUBLICATIONS

Nunez et al—U.S. Appl. No. 14/743,251, filed Jun. 18, 2015—Applicant, Motorola Solutions, Inc.

* cited by examiner

*Primary Examiner* — Phuoc H Doan
(74) *Attorney, Agent, or Firm* — Daniel R. Bestor (57) ABSTRACT

A battery-powered multi-function voice-collaboration device includes a speaker and a microphone to support voice transmission and reception. The device has an enhanced-functionality mode EFM and a reduced-functionality mode RFM and is communicatively coupled to a battery-powered portable radio. The device determines a first operating duration if operated entirely in a RFM comprising one or more battery-consuming voice functions, and determines a second estimated operating duration N if operated entirely in an EFM comprising another battery-consuming function in addition to the battery-consuming voice functions. The device requests and receives an estimated operating duration indication of the portable radio. Responsive to determining that an estimated operating duration Z of the portable radio is between the first and second durations R, N: operating the device in the EFM for a third duration and in the RFM for a fourth duration such that the third and fourth durations combined equal the duration Z.

20 Claims, 3 Drawing Sheets

METHOD, DEVICE, AND SYSTEM FOR OPERATING A MULTI-FUNCTION VOICE-COLLABORATION DEVICE TO MANAGE BATTERY LIFE

BACKGROUND OF THE INVENTION

A radio speaker microphone (RSM) device is a device in common use by first responders that pairs with a portable radio device and provides an improved voice communications experience for the first responder by placing the speaker and the microphone closer to the first responder's head, relative to the portable radio device that is typically coupled to the first responder's waist. The RSM is typically a battery-powered device that maintains a bi-directional voice communications link with the portable radio device over a wired or wireless link. The battery provides energy to support operational functions such as amplification, analog to digital and digital to analog conversion, and other functions to support the voice functionality of the RSM.

Recently, RSMs and other battery-powered voice-collaboration devices have started appearing on the market that incorporate additional functions, such as displays, video cameras, touch interfaces, digital storage, and other battery-energy-consuming functions. Battery management techniques, however, have not kept up with the increase in additional functionality and with regard to the unique characteristics of the voice-collaboration device.

Thus, there exists a need for an improved method, device, and system for operating a multi-function voice-collaboration device to manage battery life.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, device, and system for operating a voice-collaboration device to manage battery life in accordance with some embodiments.

In one embodiment a process of operating a battery-powered multi-function voice-collaboration device including a speaker and a microphone to support voice transmission and reception, the voice-collaboration device having an enhanced-functionality mode and a reduced-functionality mode and being communicatively coupled to a battery-powered portable radio includes: determining, by the voice-collaboration device, an energy-remaining amount of a battery powering the voice-collaboration device; determining, by the voice-collaboration device and as a function of the energy-remaining amount, a first estimated operating duration (R) of the voice-collaboration device if operated entirely in the reduced-functionality mode, the reduced-functionality mode comprising one or more battery-consuming voice functions selected from a list of (i) operating a first transducer to convert sound into an electrical signal for delivery to the portable radio, (ii) operating a second transducer to convert a second electrical signal received from the portable radio into sound, and (iii) operating a push-to-talk input interface at the voice-collaboration device; determining, by the voice-collaboration device and as a function of the energy-remaining amount, a second estimated operating duration (N) of the voice-collaboration device voice-collaboration device if operated entirely in the enhanced-functionality mode, the enhanced-functionality mode comprising another battery-consuming function in addition to the one or more battery-consuming voice functions; requesting, by the voice-collaboration device via one of a wired and wireless communications interface, an estimated operating duration indication of the portable radio and responsively receiving, by the voice-collaboration device via the one of the wired and wireless communications interface, the estimated operating duration indication of the portable radio; one of (i) identifying the estimated operating duration indication as an estimated operating duration (Z) of the portable radio and (ii) calculating, as a function of the estimated operating duration indication, the estimated operating duration Z of the portable radio; responsive to determining that the estimated operating duration Z of the portable radio is between the first and second estimated operating durations R, N of the voice-collaboration device (R>Z>N): operating the voice-collaboration device in the enhanced mode for a third operating duration and in the reduced-functionality mode for a fourth operating duration such that the combination of the third and fourth operating durations substantially equal the estimated operating duration Z of the portable radio.

In a further embodiment, a battery-powered voice-collaboration device that has an enhanced-functionality mode and a reduced-functionality mode and that is coupled to a battery-powered portable radio includes: a battery; a speaker; a microphone; a display; a wired or wireless transceiver; an image capture device; and one or more processors configured to: determine an energy-remaining amount of the battery powering the voice-collaboration device; determine, as a function of the energy-remaining amount, a first estimated operating duration (R) of the voice-collaboration device if operated entirely in the reduced-functionality mode, the reduced-functionality mode comprising one or more battery-consuming voice functions selected from a list of (i) operating the microphone to convert sound into an electrical signal for delivery to the portable radio, (ii) operating the speaker to convert a second electrical signal received from the portable radio into sound, and (iii) operating a push-to-talk input interface at the voice-collaboration device; determine, as a function of the energy-remaining amount, a second estimated operating duration (N) of the voice-collaboration device voice-collaboration device if operated entirely in the enhanced-functionality mode, the enhanced-functionality mode comprising another battery-consuming function in addition to the one or more battery-consuming voice functions; request, by the voice-collaboration device via the wired or wireless transceiver, an estimated operating duration indication of the portable radio and responsively receiving, via the one of the wired or wireless transceiver, the estimated operating duration indication of the portable radio; one of (i) identify the estimated operating duration indication as an estimated operating duration (Z) of the portable radio and (ii) calculate, as a function of the estimated operating duration indication, the estimated operating duration Z of the portable radio; responsive to determining that the estimated operating duration Z of the portable radio is between the first and second estimated operating durations R, N of the voice-collaboration device (R>Z>N): operate the voice-collaboration device in the enhanced mode for a third operating duration and in the reduced-functionality mode for a fourth operating duration such that the combination of the third and fourth operating durations substantially equal the estimated operating duration Z of the portable radio.

In a still further embodiment, a communication system includes: a battery-powered voice-collaboration device comprising: one or more wired or wireless first transceivers; a speaker; a microphone; a display; an image capture device; a voice-collaboration device battery; a first data store; and one or more processors configured to: determine an energy-remaining amount of the voice-collaboration device battery powering the voice-collaboration device; determine, as a function of the energy-remaining amount, a first estimated operating duration (R) of the voice-collaboration device if operated entirely in the reduced-functionality mode, the reduced-functionality mode comprising one or more battery-consuming voice functions selected from a list of (i) operating the microphone to convert sound into an electrical signal for delivery to the portable radio, (ii) operating the speaker to convert a second electrical signal received from the portable radio into sound, and (iii) operating a push-to-talk input interface at the voice-collaboration device; determine, as a function of the energy-remaining amount, a second estimated operating duration (N) of the voice-collaboration device voice-collaboration device if operated entirely in the enhanced-functionality mode, the enhanced-functionality mode comprising another battery-consuming function in addition to the one or more battery-consuming voice functions; request, by the voice-collaboration device via the wired or wireless transceiver, an estimated operating duration indication of the portable radio and responsively receiving, via the one of the wired or wireless transceiver, the estimated operating duration indication of the portable radio; one of (i) identify the estimated operating duration indication as an estimated operating duration (Z) of the portable radio and (ii) calculate, as a function of the estimated operating duration indication, the estimated operating duration Z of the portable radio; responsive to determining that the estimated operating duration Z of the portable radio is between the first and second estimated operating durations R, N of the voice-collaboration device (R>Z>N): operate the voice-collaboration device in the enhanced mode for a third operating duration and in the reduced-functionality mode for a fourth operating duration such that the combination of the third and fourth operating durations substantially equal the estimated operating duration Z of the portable radio; and a battery-powered portable radio comprising: one or more wired or wireless second transceivers; a portable radio battery; a second data store; and one or more processors configured to: periodically or intermittently determine an updated energy-remaining amount of the portable radio battery; receive, from the voice-collaboration device via the one or more wired or wireless second transceivers, a request for an estimated operating duration indication of the portable radio; and transmit, to the voice-collaboration device via the one or more wired or wireless second transceivers, one of the updated energy-remaining amount of the portable radio battery and an updated estimated operating duration of the portable radio calculated as a function of the updated energy-remaining amount.

Each of the above-mentioned embodiments will be discussed in more detail below, starting with example communication and device architectures of the system in which the embodiments may be practiced, followed by an illustration of processing steps for achieving an improved method, device, and system for operating a voice-collaboration device to manage battery life from a voice-collaboration device perspective. Further advantages and features consistent with this disclosure will be set forth in the following detailed description, with reference to the figures.

1. Communication and Device Structures

Figure 1:
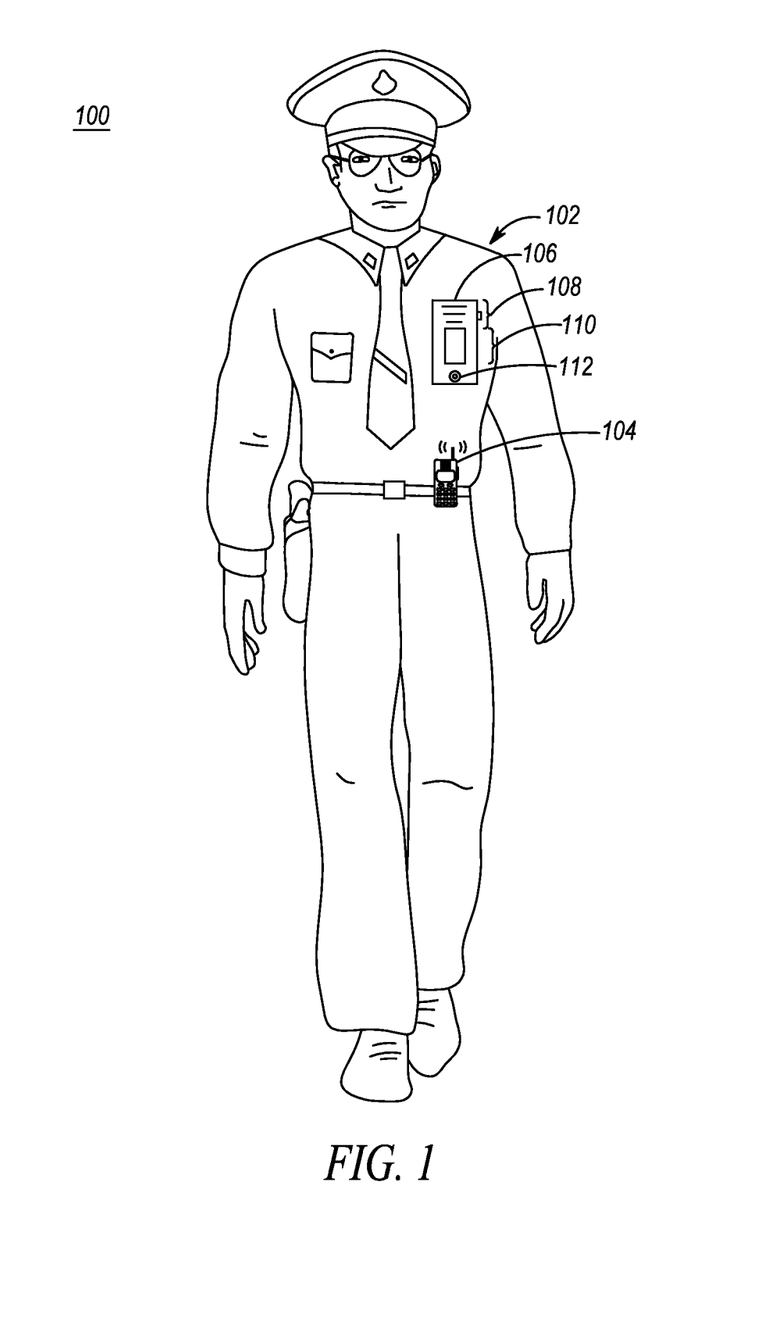
FIG. 1 is a system diagram illustrating an first responder wearing a portable radio and an associated multi-function voice-collaboration device that provides an improved method, device, and system for operating the voice-collaboration device to manage battery life in accordance with some embodiments.

Referring now to the drawings, and in particular FIG. 1, a communication system diagram illustrates a system 100 of wireless and/or wired devices that a user 102 (illustrated in FIG. 1 as a first responder) may wear, including a primary battery-powered portable radio 104 used for narrowband and/or broadband direct-mode or infrastructure communications and a battery-powered multi-function voice-collaboration device 106.

The portable radio 104 may be any wireless device used for infrastructure-supported media (e.g., voice, audio, video, etc.) communication via a long-range wireless transmitter (e.g., in comparison to a short-range transmitter such as a Bluetooth, Zigbee, or NFC transmitter) and/or transceiver with other portable radios in a same or different group of portable radios as the portable radio 104. The long-range transmitter may have a transmit range on the order of miles, e.g., 0.5-50 miles, or 3-20 miles. In the example of FIG. 1, the portable radio 104 may form the hub of communication connectivity for the user102, through which other accessory devices, such as a biometric sensor, an activity tracker, a weapon status sensor, a heads-up-display, and the voice collaboration device 106 may communicatively couple.

In order to communicate with and exchange audio and other data with the voice-collaboration device 106 (and/or other accessory devices), the portable radio 104 may contain one or more physical electronic ports (such as a USB port, an Ethernet port, an audio jack, etc.) for direct electronic coupling with the voice-collaboration device 106, and/or may contain a short-range transmitter (e.g., in comparison to the long-range transmitter such as a LMR or Broadband transmitter) and/or transceiver for wirelessly coupling with the voice-collaboration device 106. The short-range transmitter may be a Bluetooth, Zigbee, or NFC transmitter having a transmit range on the order of 0.01-100 meters, or 0.1-10 meters.

The voice-collaboration device 106 provides voice functionality features similar to a traditional remote speaker microphone (RSM), including one or more of acting as a remote microphone that is closer to the user's 102 mouth, providing a remote speaker allowing play back of audio closer to the user's 102 ear, and including a push-to-talk (PTT) switch or other type of PTT input. The voice and/or audio recorded at the remote microphone may be provided to the portable radio 104 for further transmission to other portable radios or to a wireless infrastructure. The voice and/or audio played back at the remote speaker may be received from the portable radio 104 from one or more other portable radios and/or from the wireless infrastructure. The voice-collaboration device 106 may include a separate physical PTT switch 108 that functions, in cooperation with the portable radio 104, to maintain the portable radio 104 and voice-collaboration device 106 in a monitor only mode, and which switches the devices to a transmit-only mode (for half-duplex devices) or transmit and receive mode (for full-duplex devices) upon depression or activation of the PTT switch 108. The portable radio 104 and voice-collaboration device 106 may form part of a group communications architecture that allows a single portable radio, such as the portable radio 104, to communicate with one or more group members (not shown) associated with a particular group of portable radios at a same time.

Additional functionality features may be provided at the voice-collaboration device 106 as well. For example, a display screen 110 may be provided for displaying images, video, and/or text to the user first responder 102. The display screen 110 may be, for example, a liquid crystal display (LCD) screen or an organic light emitting display (OLED) display screen. In some embodiments, a touch sensitive input interface may be incorporated into the display screen 110 as well, allowing the user first responder 102 to interact with content provided on the display screen 110. A soft PTT input may also be provided, for example, via such a touch interface.

A video camera 112 may also be provided at the voice-collaboration device 106, integrating an ability to capture images and/or video and store the captured image data or transmit the captured image data to the portable radio 104.

Additional features and functions not illustrated in FIG. 1 may also be integrated into the voice-collaboration device 106, including but not limited to an emergency indicator input button or switch, a voice recognition function, a voice to text conversion function, an internal audio/video storage function, a navigation function, a personal-area-network collaboration function, and a broadband communication function, among other possibilities.

The voice-collaboration device 106 may be operable in a number of different modes, including a reduced-functionality mode in which all or only a subset of voice functionality features are enabled, and one or more enhanced-functionality modes, in which one or more additional functionality features, in addition to the voice functionality features, are enabled. The voice-collaboration device 106 may intelligently choose which mode to operate in as a function of a determined battery-energy remaining in its integrated battery (not shown in FIG. 1), an amount of energy consumed by the voice functionality features and the additional functionality features, and a determined battery-remaining amount of the portable radio 104 to which it is communicatively coupled, in accordance with the process set forth below.

Figure 2:
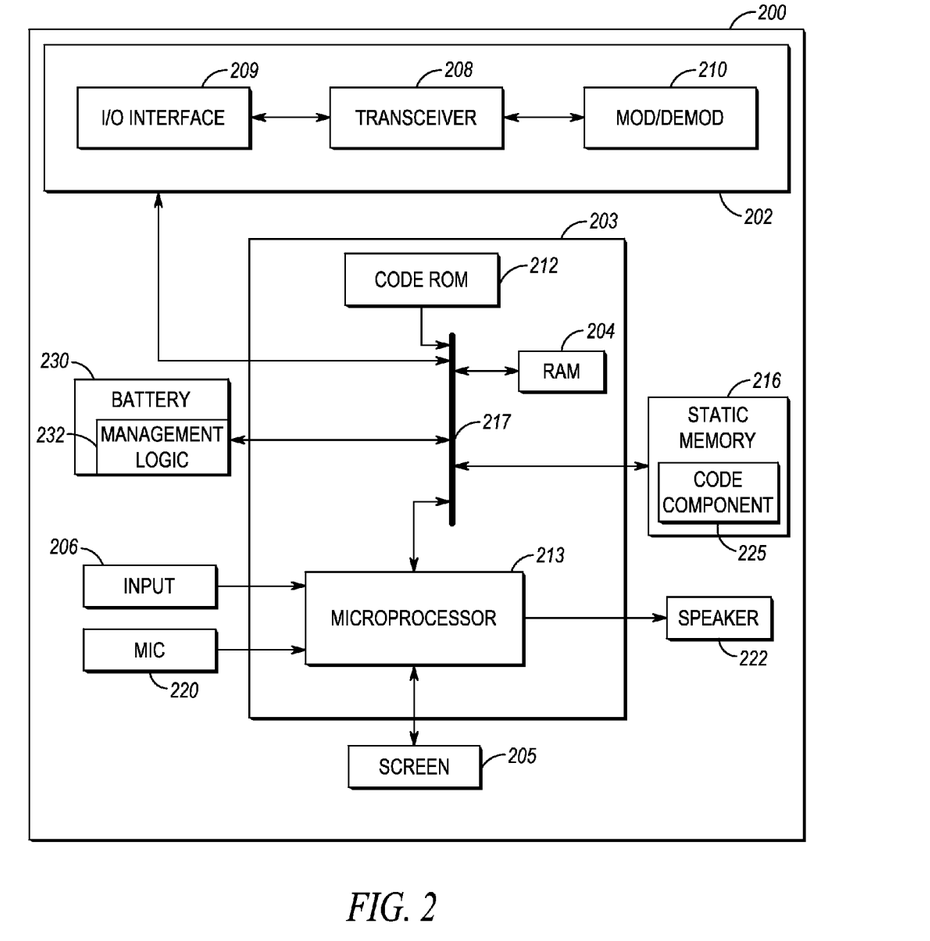
FIG. 2 is a device diagram showing a device structure of the multi-function voice-collaboration device of FIG. 1 in accordance with some embodiments.

Referring to FIG. 2, a schematic diagram illustrates a multi-function voice-collaboration device 200 according to some embodiments of the present disclosure. Voice-collaboration device 200 may be, for example, the same as or similar to the voice-collaboration device 106 of FIG. 1. As shown in FIG. 2, voice-collaboration device 200 includes a communications unit 202 coupled to a common data and address bus 217 of a processing unit 203. The voice-collaboration device 200 may also include an input unit (e.g., keypad, pointing device, touch-sensitive surface, etc.) 206 and a display screen 205, each coupled to be in communication with the processing unit 203.

A microphone 220 captures audio from a user that is further vocoded by processing unit 203 and transmitted as voice stream data by communication unit 202 to other portable radios and/or other devices via a portable radio coupled to the voice-collaboration device 200. A communications speaker 222 reproduces audio that is decoded from voice streams of voice calls received via the portable radio from other portable radios and/or from an infrastructure device via the communications unit 202.

The processing unit 203 may include a code Read Only Memory (ROM) 212 coupled to the common data and address bus 217 for storing data for initializing system components. The processing unit 203 may further include a microprocessor 213 coupled, by the common data and address bus 217, to a Random Access Memory (RAM) 204 and a static memory 216.

The communications unit 202 may include one or more wired or wireless input/output (I/O) interfaces 209 that are configurable to communicate with the portable radio 104 and/or with other accessory devices.

The communications unit 202 may include one or more wireless transceivers 208, such as a Bluetooth transceiver, a Wi-Fi transceiver perhaps operating in accordance with an IEEE 802.11 standard (e.g., 802.11a, 802.11b, 802.11g), a Zigbee transceiver, and/or other similar type of wireless transceiver configurable to communicate via a wireless radio network. The communications unit 202 may additionally or alternatively include one or more wireline transceivers 208, such as an Ethernet transceiver, a Universal Serial Bus (USB) transceiver, a Tip, Ring, Sleeve (TRS) connection, a Tip, Ring, Ring, Sleeve (TRRS) connection, or similar transceiver configurable to communicate via a twisted pair wire, a coaxial cable, a fiber-optic link, an audio jack, or a similar physical connection to a wireline network. The transceiver 208 is also coupled to a combined modulator/demodulator 210.

The microprocessor 213 has ports for coupling to the input unit 206 and the microphone unit 220, and to the display screen 205 and speaker 222. Static memory 216 may store operating code 225 for the microprocessor 213 that, when executed, performs one or more of the voice-collaboration device processing steps set forth in FIG. 3 and accompanying text. Static memory 216 may also store, permanently or temporarily, audio and/or video information generated by voice functionality features and/or additional functionality features.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

A battery unit 230 provides energy to selectively power the voice functionality features and/or additional functionality features of the voice-collaboration device 200. The battery unit 230 may include a non-rechargeable primary cell battery including but not limited to an alkaline battery or a zinc-carbon battery. Additionally or alternatively, the battery unit 230 may include a rechargeable secondary cell battery including but not limited to a lithium-ion battery or a nickel-metal-hydride battery. For example, the battery unit 230 may include a lithium-ion battery having an energy store in the range of 1000-5000 mAh. The battery unit 230 may also include integrated management logic 232 for managing the battery, calculating remaining energy-store values, and responding to requests for remaining energy-store values. In other embodiments, the management logic 232 may be provided external to the battery unit 230, for example, in a dedicated processor coupled between the battery and the bus 217, and/or integrated into the microprocessor 213. Other possibilities exist as well.

Portable radio 104 may contain substantially the same or similar device structures as the voice-collaboration device 200, including a similar processing unit and communication unit for interfacing with the voice-collaboration device 200 and a similar battery and battery management logic for responding to requests for an estimated portable radio operating duration indication from the voice-collaboration device 200.

Figure 3:
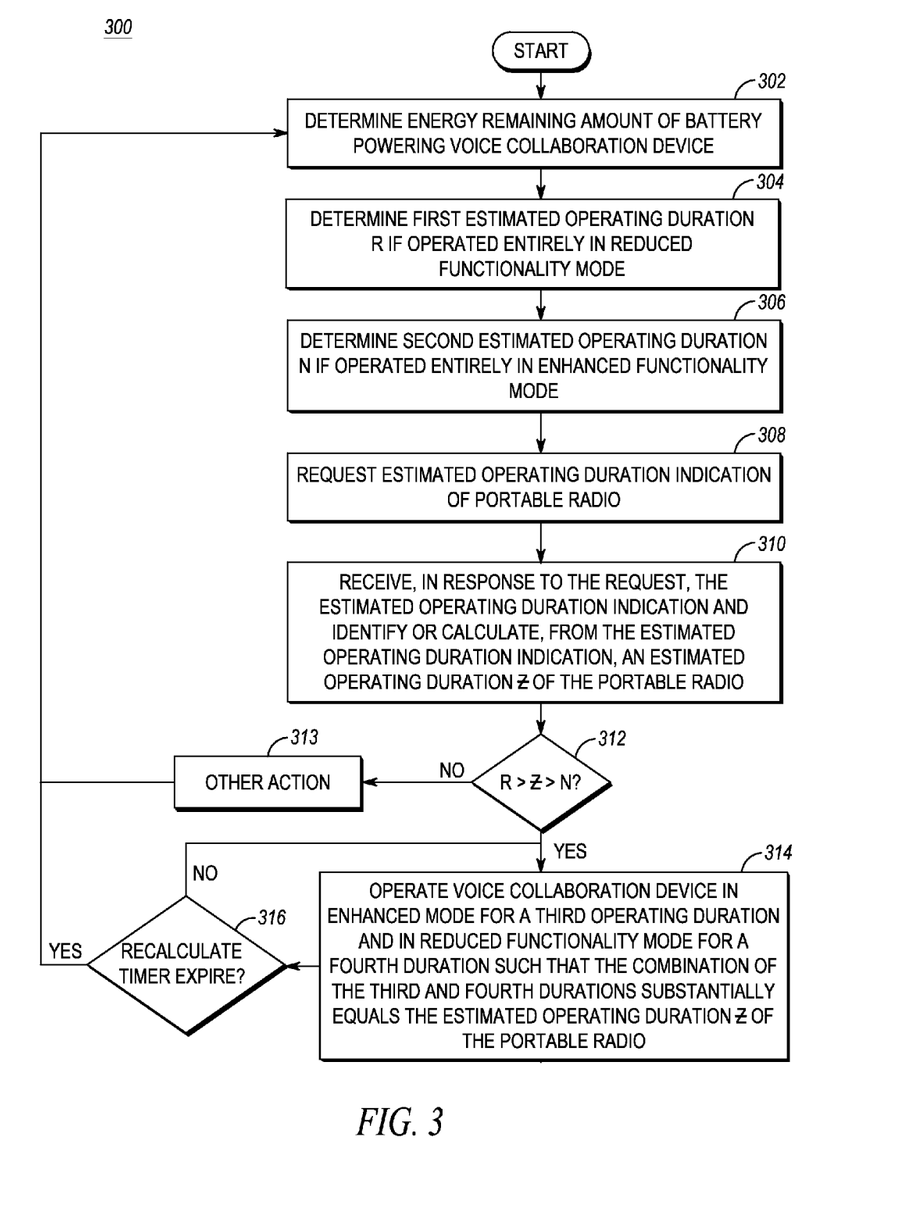
FIG. 3 illustrates a flow chart setting forth process steps for operating the voice-collaboration device of FIGS. 1 and/or 2 to manage battery life in accordance with some embodiments.

2. Processes for Operating a Voice-Collaboration Device to Manage Battery Life Turning now to FIG. 3, a flow chart diagram illustrates a method 300 for operating a voice-collaboration device to manage battery life in accordance with some embodiments. While a particular order of processing steps, message receptions, and/or message transmissions is indicated in FIG. 3 for exemplary purposes, timing and ordering of such steps, receptions, and transmissions may vary where appropriate without negating the purpose and advantages of the examples set forth in detail throughout the remainder of this disclosure. The voice-collaboration device may execute method 300 at power-on, at some predetermined periodic time period thereafter, in response to a trigger raised locally at the device via an internal process or via an input interface, or in response to receiving a trigger from the portable radio to which it is communicably coupled. Although not illustrated in FIG. 3, the voice-collaboration device may operate in any number of reduced-functionality modes or variations of enhanced-functionality modes prior to executing method 300.

Method 300 begins by a voice-collaboration device determining an energy-remaining amount of a battery powering the voice-collaboration device. The energy-remaining amount may be determined via battery management logic such as battery management logic 232 of voice-collaboration device 200. The battery management logic may implement any one or more state-of-charge determinations, including but not limited to, a voltage measurement method, a current integration method, a pressure measurement method, and a specific gravity measurement. The state-of-charge determination may directly provide an estimated energy-remaining value in milli-ampere-hours (mAh), or the state-of-charge determination may provide a value that can be referenced against another mapping, such as a voltage-to-mAh mapping, that provides an estimated energy-remaining value in mAh. For example, the state-of-charge determination may determine that the voice-collaboration device's remaining battery energy is approximately 3000 mAh, or about 75% charged relative to a full energy-remaining amount of approximately 4000 mAh. Other values and other full-charge states are possible as well. In some embodiments, the voice-collaboration device may contain more than one battery, and the state-of-charge determination may aggregate remaining battery energy values from each of the two or more voice collaboration device batteries.

At step 304, the voice-collaboration device determines a first estimated operating duration R if the voice-collaboration device were operated entirely in a reduced-functionality mode. The reduced-functionality mode is a mode including one or more, or all, battery-consuming voice functions selected from a list of (i) operating a first transducer to convert sound into an electrical signal for delivery to the portable radio, (ii) operating a second transducer to convert a second electrical signal received from the portable radio into sound, and (iii) operating a push-to-talk input interface at the voice-collaboration device. In other embodiments, the reduced-functionality mode may also include operating an emergency input button or switch. The voice-collaboration device uses a predetermined or dynamically determined battery-consumption rate associated with the reduced-functionality mode. For example, the reduced-functionality mode may be determined during testing to consume an average in the range of 200-400 mA/hour, including for example 300 mA/hour. This consumption rate may then be stored in the voice-collaboration device and used by the voice-collaboration device to determine, as a function of the determined energy-remaining amount and the determined consumption rate in reduced-functionality mode, the first estimated operating duration R. In a still further embodiment, the voice-collaboration device may initially, or periodically or intermittently, operate in the reduced-functionality mode and dynamically calculate a consumption rate associated with the reduced-functionality mode. This dynamically determined consumption rate may then be used by the voice-collaboration device to determine, as a function of the determined energy-remaining amount and the dynamically determined consumption rate in reduced-functionality mode, the first estimated operating duration R. For example, given an energy-remaining amount of 3000 mAh and a consumption rate in the reduced-functionality mode of 300 mA/hour, the estimated operating duration R is approximately 10 hours.

At step 306, the voice-collaboration device determines a second estimated operating duration N if the voice-collaboration device were operated entirely in an enhanced-functionality mode. The enhanced-functionality mode is a mode including all of the one or more battery-consuming voice functions of the reduced-functionality mode, and one or more additional battery consuming functions selected from operating a display capable of displaying text and/or images, operating a touch-sensitive input element, operating an image and/or video capture device, operating an application with broadband data access, operating a navigation application with locationing functionality, operating a voice-recognition or voice-to-text conversion functionality, and operating personal-area-network collaboration functionality with other wearable devices via a short-range wireless connection. The voice-collaboration device uses a predetermined or dynamically determined battery-consumption rate associated with the enhanced-functionality mode. For example, the enhanced-functionality mode may be determined during testing to consume an average in the range of 800-1200 mA/hour, including for example 1000 mA/hour. This higher consumption rate may then be stored in the voice-collaboration device and used by the voice-collaboration device to determine, as a function of the determined energy-remaining amount and the determined consumption rate in enhanced-functionality mode, the second estimated operating duration N. In a still further embodiment, the voice-collaboration device may initially, or periodically or intermittently, operate in the enhanced-functionality mode and dynamically calculate a consumption rate associated with the enhanced-functionality mode. This dynamically determined consumption rate may then be used by the voice-collaboration device to determine, as a function of the determined energy-remaining amount and the dynamically determined consumption rate in enhanced-functionality mode, the second estimated operating duration N. For example, given an energy-remaining amount of 3000 mAh and a consumption rate in the enhanced-functionality mode of 1000 mA/hour, the estimated operating duration N is approximately 3 hours.

In some embodiments, the voice-collaboration device may be operable in only the reduced-functionality mode and the enhanced-functionality mode and determine corresponding first and second estimated operating durations R and N. In additional or alternative embodiments, the voice-collaboration device may be capable of operating in a plurality of enhanced-functionality modes in which different ones of the one or more additional battery consuming functions are operating. In this embodiment, a plurality of second estimated operating durations N1 and N2 (or more) may be calculated based on an increasing number of the ones of the one or more additional battery consuming functions being activated. For example, given an energy-remaining amount of 3000 mAh and a consumption rate in the enhanced-functionality mode of 1000 mA/hour for operating the video camera, the estimated operating duration N1 is approximately 3 hours, while for a consumption rate in the enhanced-functionality mode of 1500 mA/hour for operating the video camera and navigation functions, the estimated operating duration N2 is approximately 2 hours.

At step 308, the voice-collaboration device requests an estimated operating duration indication from the portable radio that it is communicatively coupled to for voice communications. For example, the portable radio may be the portable radio 104 of FIG. 1, and the voice-collaboration device may transmit the request to the portable radio via a short-range wireless transmitter or via a physical wired connection.

The portable radio, after receiving the request, may respond to the request in a number of ways. For example, the portable radio may determine an estimated operating duration Z of the portable radio directly, using a same or similar method as set forth above in step 304, using a determined energy-remaining amount of a battery powering its operation and a pre-configured or dynamically determined portable radio energy-consumption rate. The portable radio energy-consumption rate may be preconfigured at the portable radio based on an average power consumption during a testing phase, or may be dynamically determined by the portable radio by measuring an average power consumption over a prior period of time. For example, the portable radio may determine that the portable radio's remaining battery energy is approximately 5000 mAh, or about 83% charged relative to a full energy-remaining amount of approximately 6000 mAh. Other values and other full-charge states are possible as well. Further, the portable radio may dynamically determine, or retrieve a predetermined value indicating, an average consumption rate of the portable radio is approximately 1000 mA/h. The portable radio may then calculate an estimated operating duration of 5 hours, and transmit the estimated operating duration of 5 hours back to the voice-collaboration device as the estimated operating duration indication of the portable radio.

Additionally or alternatively, the portable radio may provide the voice-collaboration device with other information indicative of its estimated operating duration. For example, the portable radio may merely provide a remaining battery-energy amount value, such as the value 5000 mAh in the example set forth above. The portable radio may also provide an identification of the portable radio or some other identifier for use by the voice-collaboration device in determining an average consumption rate of the portable radio. In still further embodiments, the portable radio may provide the pre-configured or dynamically determined consumption rate to the voice-collaboration device for use by the voice-collaboration device in calculating an estimated operating duration of the portable radio. The estimated operating duration indication may be transmitted by the portable radio back to the voice-collaboration device over the same wired or wireless link over which the request was received.

At step 310, the voice-collaboration device receives, in response to the request at step 308, the estimated operating duration indication from the portable radio. Depending on the form of the estimated operating duration indication, the voice-collaboration device may use the indication directly (e.g., the indication is the estimated operating duration Z of the portable radio), or may calculate the estimated operating duration Z of the portable radio using the indication. For example, the indication may include a portable radio battery-energy-remaining value, and the voice-collaboration device may access a predetermined consumption rate associated with the portable radio and calculate the operating duration of the portable radio itself. In one example, the indication may include an identifier identifying a type of the portable radio, which the voice-collaboration device may use to index into a table that associates types of portable radios with average energy-consumption rates. Still further, the voice-collaboration device may use a portable radio battery-energy-remaining amount and an average consumption rate, both included in the indication, to calculate the operating duration of the portable radio itself. Other examples are possible as well. Consistent with the example set forth above, the voice-collaboration device determines that the estimated operating duration Z of the portable radio is 5 hours.

At step 312, the voice-collaboration device determines if the estimated operating duration of the portable radio Z is between the estimated operating duration of the voice-collaboration device in reduced-functionality mode R and the estimated operating duration of the voice-collaboration device in enhanced-functionality mode N, in other words, the voice-collaboration device evaluates the expression: R>Z>N?

If the expression R>Z>N evaluates to false, processing proceeds to step 313, where some other action is taken outside of this disclosure. More specifically, processing would proceed to step 313 if the voice-collaboration device had enough battery energy stored to outlast the portable radio even when operating entirely in enhanced-functionality mode, or if the voice-collaboration device did not have enough battery energy to outlast the portable radio when operating entirely in reduced-functionality mode (in which case a critical warning is issued to the user via one or more of the display screen such as display 205 of FIG. 2 or the speaker such as speaker 222 of FIG. 2).

If, on the other hand, the expression R>Z>N evaluates to true, processing proceeds to step 314, where the voice-collaboration device determines how much longer it can continue to operate in the enhanced-functionality mode before it has to switch to the reduced-functionality mode so that the voice-collaboration device continues to provide, at the minimum, the reduced-functionality mode for substantially the entire duration of the estimated operating duration Z of the portable radio. In some embodiments, the voice-collaboration device may raise a warning to the user via one or more of the display screen such as display 205 of FIG. 2 or the speaker such as speaker 222 of FIG. 2, indicating that an amount of battery-energy remaining is not sufficient to run the voice-collaboration device in an enhanced mode for the entirety of the estimated operating duration Z of the portable radio.

At step 314, the voice-collaboration device identifies a third operating duration in which it operates in the reduced-functionality mode and thus consumes remaining battery energy at a lower consumption rate, and a fourth operating duration in which it operates in the enhanced-functionality mode and thus consumes remaining battery energy at a higher consumption rate, such that the third and fourth operating durations, when combined, substantially equal the estimated operating duration Z of the portable radio. In other words, the voice-collaboration device calculates a new estimated operating duration $R_{new}$ that the voice-collaboration device operates in the reduced-functionality mode and a new estimated operating duration $N_{new}$ that the voice-collaboration device operates in the enhanced-functionality mode such that $R_{new}+N_{new}=Z$. Using the values set forth in the examples above, the voice-collaboration device solves the equations (1000 mA/hr*A)+(300 mA/hr*B)=3000 mAh and A+B=5 hours, where A is the time the voice-collaboration device can operate in the enhanced mode and B is the time the voice collaboration device can operate in the reduced functionality mode, solving for A and B yields approximately 2.143 hours in the enhanced mode ($N_{new}$) and approximately 2.857 hours in the reduced mode ($R_{new}$), resulting in a total consumption of approximately 3000 mAh while providing a maximum amount of time in the enhanced-functionality mode, but maintaining at least a reduced-functionality mode for the entire determined estimated operating duration Z of the portable radio.

In some embodiments, the voice-collaboration device may operate sequentially in the enhanced-functionality mode for the $N_{new}$ time period, followed by operating in the reduced-functionality mode for the $R_{new}$ time period. In other embodiments, the voice-collaboration device may intermittently switch to the enhanced-functionality mode on an as-needed basis (in response to an input indication from the user via input interface such as input 206 of FIG. 2, via a detected command via microphone 220, or via an instruction received from the portable radio), but with the limitation that the voice-collaboration device cannot spend more than $N_{new}$ amount of time in the enhanced-functionality mode before restricting any further operation of the device to the reduced-functionality mode only. If the user is judicious in his or her use of the enhanced-functionality mode and the voice-collaboration device subsequently determines that the operating time remaining Z for the portable radio eventually equals the remaining enhanced-functionality time $N_{new}$, the voice-collaboration device may automatically switch to the enhanced-functionality mode for the remaining time $N_{new}$. In some embodiments, the voice-collaboration device may detect when the enhanced-functionality time $N_{new}$ has been used up or is almost used up (e.g., less than 5 minutes remain), and may raise a critical warning to the user via one or more of the display screen such as display 205 of FIG. 2 or the speaker such as speaker 222 of FIG. 2, indicating as much.

In some embodiments, processing at the voice-collaboration device may periodically or intermittently proceed from step 314 to step 316, where the voice-collaboration device determines if a recalculation timer, set in any one of steps 302-310 and 314, has expired. If the recalculation timer has not expired, processing may return to step 314. If, on the other hand, the recalculation timer has expired, processing may return to step 302 so that the voice-collaboration device may recalculate the durations determined in method 300 and act accordingly. The recalculation timer may be set to a value, for example, of 20, 30, or 60 minutes. In some embodiments, the recalculation timer may vary based on the remaining time Z, such that the higher the remaining time Z, the less frequent the recalculations, but as the remaining time Z decreases, the durations in method 300 are recalculated more often.

Furthermore, in some embodiments, an amount of "buffer" may be added into the calculations of third and fourth time periods in step 314 to more predictably ensure that the voice-collaboration device's remaining duration substantially equals the remaining duration of the portable radio, but extends slightly beyond the life of the portable radio. For example, the value of the estimated operating duration Z of the portable radio may be slightly and artificially extended to ensure the voice-collaboration device does not run out of battery energy before the portable radio. The value of the estimated operating duration Z may be extended by 1, 5, or 10%, or 1, 10, or 20 minutes, among other possibilities. Additionally or alternatively, the energy-remaining amount of the voice-collaboration device battery may be slightly reduced by 1, 5, or 10% or 1, 10, or 20 minutes to similarly ensure that the voice-collaboration device's remaining duration extends slightly beyond the life of the portable radio. Other methods of providing a buffer could be implemented as well.

3. Conclusion

In accordance with the foregoing, an improved device, method, and system for operating a voice-collaboration device to manage battery life may be achieved. As a result of the foregoing, a first responder may be assured that the voice collaboration device's critical voice functionality remains available for at least the determined remaining operating duration of the portable radio to which it is communicatively coupled, and that additional enhanced functionality can be safely provided at the voice collaboration device as long as it does not impede the voice collaboration device's ability to provide the critical voice functionality remains available for at least the determined remaining operating duration of the portable radio. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of operating a battery-powered multi-function voice-collaboration device including a speaker and a microphone to support voice transmission and reception, the voice-collaboration device having an enhanced-functionality mode and a reduced-functionality mode and being communicatively coupled to a battery-powered portable radio, the method comprising:

determining, by the voice-collaboration device, an energy-remaining amount of a battery powering the voice-collaboration device;

determining, by the voice-collaboration device and as a function of the energy-remaining amount, a first estimated operating duration (R) of the voice-collaboration device if operated entirely in the reduced-functionality mode, the reduced-functionality mode comprising one or more battery-consuming voice functions selected from a list of (i) operating a first transducer to convert sound into an electrical signal for delivery to the portable radio, (ii) operating a second transducer to convert a second electrical signal received from the portable radio into sound, and (iii) operating a push-to-talk input interface at the voice-collaboration device;

determining, by the voice-collaboration device and as a function of the energy-remaining amount, a second estimated operating duration (N) of the voice-collaboration device if operated entirely in the enhanced-functionality mode, the enhanced-functionality mode comprising another battery-consuming function in addition to the one or more battery-consuming voice functions;

requesting, by the voice-collaboration device via one of a wired and wireless communications interface, an estimated operating duration indication of the portable radio and responsively receiving, by the voice-collaboration device via the one of the wired and wireless communications interface, the estimated operating duration indication of the portable radio;

one of (i) identifying the estimated operating duration indication as an estimated operating duration (Z) of the portable radio and (ii) calculating, as a function of the estimated operating duration indication, the estimated operating duration Z of the portable radio;

responsive to determining that the estimated operating duration Z of the portable radio is between the first and second estimated operating durations R, N of the voice-collaboration device (R>Z>N):

operating the voice-collaboration device in the enhanced mode for a third operating duration and in the reduced-functionality mode for a fourth operating duration such that the combination of the third and fourth operating durations substantially equal the estimated operating duration Z of the portable radio.

2. The method of claim 1, further comprising the voice-collaboration device:
   estimating the third operating duration that the voice-collaboration device operates in the enhanced mode followed sequentially by the fourth operating duration that the voice-collaboration device operates in the reduced-functionality mode such that the sequential combination of the third and fourth operating durations substantially equal the estimated operating duration of the portable radio; and
   sequentially operating the voice-collaboration device in the enhanced mode for the third operating duration and then in the reduced mode for the fourth operating duration.

3. The method of claim 1, further responsive to determining that the estimated operating duration of the portable radio is between the first and second estimated operating durations of the voice-collaboration device (R>Z>N): triggering a user notification associated with an imminent loss of enhanced functionality.

4. The method of claim 1, wherein the enhanced-functionality mode comprises operating one or more enhanced-functionality features selected from operating a display capable of displaying text and/or images, operating a touch-sensitive input element, operating an image and/or video capture device, operating an application with broadband data access, and operating a navigation application with locationing functionality.

5. The method of claim 1, wherein the reduced-functionality mode is a voice-only mode consisting of operating a microphone, a speaker, and a push-to-talk input switch to the exclusion of the one or more enhanced-functionality features.

6. The method of claim 1, wherein the enhanced-functionality mode comprises operating an image and/or video capture device; and
   wherein the reduced-functionality mode is a voice-only mode consisting of operating a microphone, a speaker, and a push-to-talk input switch to the exclusion of the image and/or video capture device.

7. The method of claim 1, further comprising periodically:
   re-calculating the power-remaining amount of a battery powering the voice-collaboration device;
   re-determining the first estimated operating duration R and the second estimated operating duration N;
   re-requesting the estimated operating duration Z;
   re-estimating the third and fourth operating durations; and
   sequentially operating the voice-collaboration device in the enhanced mode for the re-estimated third operating duration and then in the reduced mode for the re-estimated fourth operating duration.

8. The method of claim 1, wherein requesting the estimated operating duration Z of the portable radio comprises wirelessly transmitting, via the wireless communications interface, a request for the estimated operating duration Z of the portable radio and subsequently receiving, via the wireless communications interface, the estimated operating duration Z of the portable radio.

9. The method of claim 1, wherein the received estimated operating duration Z is an estimated time remaining until the portable radio consumes all of its available battery energy.

10. The method of claim 1, wherein the received estimated operating duration Z includes a battery-energy-remaining amount and an estimated battery-energy-consumption rate of the portable radio, the method further comprising calculating, an estimated time-remaining until the portable radio consumes all of its available battery energy using the received battery-energy-remaining amount and the estimated battery-energy-consumption rate.

11. The method of claim 1, wherein determining the first estimated operating duration R of the voice-collaboration device if operated entirely in the reduced-functionality mode comprises dividing the energy-remaining amount by a first pre-configured energy-dissipation rate associated with the one or more battery-consuming voice functions.

12. The method of claim 11, wherein determining the second estimated operating duration N of the voice-collaboration device if operated entirely in the enhanced-functionality mode comprises dividing the energy-remaining amount by a second pre-configured energy-dissipation rate, higher than the first pre-configured energy-dissipation rate, associated with operating the another battery-consuming function and the one or more battery-consuming voice functions.

13. The method of claim 1, further comprising operating the voice-collaboration device in a further enhanced-functionality mode for a fifth period of time prior to determining that the estimated operating duration of the portable radio is between the first and second estimated operating durations of the voice-collaboration device (R>Z>N), the further enhanced-functionality mode comprising a still further another battery-consuming function in addition to the another battery-consuming function and in addition to the one or more battery-consuming voice functions.

14. A battery-powered voice-collaboration device that has an enhanced-functionality mode and a reduced-functionality mode and that is coupled to a battery-powered portable radio, the voice-collaboration device comprising:
   a battery;
   a speaker;
   a microphone;
   a display;
   a wired or wireless transceiver;
   an image capture device; and
   one or more processors configured to:
      determine an energy-remaining amount of the battery powering the voice-collaboration device;
      determine, as a function of the energy-remaining amount, a first estimated operating duration (R) of the voice-collaboration device if operated entirely in the reduced-functionality mode, the reduced-functionality mode comprising one or more battery-consuming voice functions selected from a list of (i) operating the microphone to convert sound into an electrical signal for delivery to the portable radio, (ii) operating the speaker to convert a second electrical signal received from the portable radio into sound, and (iii) operating a push-to-talk input interface at the voice-collaboration device;
      determine, as a function of the energy-remaining amount, a second estimated operating duration (N) of the voice-collaboration device if operated entirely in the enhanced-functionality mode, the enhanced-functionality mode comprising another battery-consuming function in addition to the one or more battery-consuming voice functions;
      request, by the voice-collaboration device via the wired or wireless transceiver, an estimated operating duration indication of the portable radio and responsively receiving, via the one of the wired or wireless transceiver, the estimated operating duration indication of the portable radio;

one of (i) identify the estimated operating duration indication as an estimated operating duration (Z) of the portable radio and (ii) calculate, as a function of the estimated operating duration indication, the estimated operating duration Z of the portable radio;

responsive to determining that the estimated operating duration Z of the portable radio is between the first and second estimated operating durations R, N of the voice-collaboration device (R>Z>N):

operate the voice-collaboration device in the enhanced mode for a third operating duration and in the reduced-functionality mode for a fourth operating duration such that the combination of the third and fourth operating durations substantially equal the estimated operating duration Z of the portable radio.

15. The battery-powered voice-collaboration device of claim 14, wherein the one or more processors are further configure to, responsive to determining that the estimated operating duration of the portable radio is between the first and second estimated operating durations of the voice-collaboration device (R>Z>N): trigger a user notification, via the display, associated with an imminent loss of enhanced functionality.

16. The battery-powered voice-collaboration device of claim 14, wherein the enhanced-functionality mode comprises operating one or more enhanced-functionality features selected from operating a display capable of displaying text and/or images, operating a touch-sensitive input element, operating an image and/or video capture device, operating an application with broadband data access, and operating a navigation application with locationing functionality.

17. The battery-powered voice-collaboration device of claim 14, wherein the reduced-functionality mode is a voice-only mode consisting of operating a microphone, a speaker, and a push-to-talk input switch to the exclusion of the one or more enhanced-functionality features.

18. The battery-powered voice-collaboration device of claim 14, wherein the one or more processors are further configure to:

estimate the third operating duration that the voice-collaboration device operates in the enhanced mode followed sequentially by the fourth operating duration that the voice-collaboration device operates in the reduced-functionality mode such that the sequential combination of the third and fourth operating durations substantially equal the estimated operating duration of the portable radio; and sequentially operate the voice-collaboration device in the enhanced mode for the third operating duration and then in the reduced mode for the fourth operating duration.

19. The battery-powered voice-collaboration device of claim 14, wherein the received estimated operating duration Z is an estimated time remaining until the portable radio consumes all of its available battery energy.

20. A communication system comprising:

a battery-powered voice-collaboration device comprising:
one or more wired or wireless first transceivers;
a speaker;
a microphone;
a display;
an image capture device;
a voice-collaboration device battery;
a first data store; and one or more processors configured to:
determine an energy-remaining amount of the voice-collaboration device battery powering the voice-collaboration device;

determine, as a function of the energy-remaining amount, a first estimated operating duration (R) of the voice-collaboration device if operated entirely in the reduced-functionality mode, the reduced-functionality mode comprising one or more battery-consuming voice functions selected from a list of (i) operating the microphone to convert sound into an electrical signal for delivery to the portable radio, (ii) operating the speaker to convert a second electrical signal received from the portable radio into sound, and (iii) operating a push-to-talk input interface at the voice-collaboration device;

determine, as a function of the energy-remaining amount, a second estimated operating duration (N) of the voice-collaboration device if operated entirely in the enhanced-functionality mode, the enhanced-functionality mode comprising another battery-consuming function in addition to the one or more battery-consuming voice functions;

request, by the voice-collaboration device via the wired or wireless transceiver, an estimated operating duration indication of the portable radio and responsively receiving, via the one of the wired or wireless transceiver, the estimated operating duration indication of the portable radio;

one of (i) identify the estimated operating duration indication as an estimated operating duration (Z) of the portable radio and (ii) calculate, as a function of the estimated operating duration indication, the estimated operating duration Z of the portable radio;

responsive to determining that the estimated operating duration Z of the portable radio is between the first and second estimated operating durations R, N of the voice-collaboration device (R>Z>N):

operate the voice-collaboration device in the enhanced mode for a third operating duration and in the reduced-functionality mode for a fourth operating duration such that the combination of the third and fourth operating durations substantially equal the estimated operating duration Z of the portable radio; and a battery-powered portable radio comprising:
one or more wired or wireless second transceivers;
a portable radio battery;
a second data store; and
one or more processors configured to:
periodically or intermittently determine an updated energy-remaining amount of the portable radio battery;

receive, from the voice-collaboration device via the one or more wired or wireless second transceivers, a request for an estimated operating duration indication of the portable radio; and transmit, to the voice-collaboration device via the one or more wired or wireless second transceivers, one of the updated energy-remaining amount of the portable radio battery and an updated estimated operating duration of the portable radio calculated as a function of the updated energy-remaining amount.

* * * * *